(12) United States Patent
deCarmo

(10) Patent No.: US 6,341,330 B1
(45) Date of Patent: Jan. 22, 2002

(54) METHOD AND SYSTEM FOR CACHING A SELECTED VIEWING ANGLE IN A DVD ENVIRONMENT

(75) Inventor: Linden A. deCarmo, Plantation, FL (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/122,812

(22) Filed: Jul. 27, 1998

(51) Int. Cl.[7] .............................................. G06F 12/00
(52) U.S. Cl. ...................... 711/113; 711/157; 345/418
(58) Field of Search ................................ 711/113, 157; 345/8, 302, 418

(56) References Cited

U.S. PATENT DOCUMENTS 5,502,833 A * 3/1996 Byrn et al. .................. 395/459
5,717,895 A * 2/1998 Leedom et al. ............. 711/140
5,734,862 A * 3/1998 Kulas .......................... 711/157
6,014,671 A * 1/2000 Castelli et al. .............. 707/101

* cited by examiner

Primary Examiner—Matthew Kim
Assistant Examiner—Pierre M. Vital
(74) Attorney, Agent, or Firm—Kudirka & Jobse, LLP

(57) ABSTRACT

A caching method and system for use in a DVD player is disclosed that selectively caches only one of multiple viewing angles recorded on the DVD medium. This system allows optimization of the caching resources by only caching that portion of the DVD stream that relates to the currently selected angle being displayed or viewed during video playback. If another viewing angle is selected, the current contents of the cache for the previously-selected viewing angle are discarded and the system proceeds to cache the data for the newly selected viewing angle.

12 Claims, 5 Drawing Sheets

METHOD AND SYSTEM FOR CACHING A SELECTED VIEWING ANGLE IN A DVD ENVIRONMENT

RELATED APPLICATIONS

This application is one of a number of related applications filed on an even date herewith and commonly assigned, the subject matters of which are incorporated herein by reference for all purposes, including U.S. patent application Ser. No. 09/122,834, entitled METHOD AND SYSTEM FOR SCANNING AND DISPLAYING MULTIPLE VIEW ANGLES FORMATTED IN DVD CONTENT, by Linden A. deCarmo and Amir M. Mobini.

FIELD OF THE INVENTION

This invention relates generally to improvements in digital versatile disc systems and, more particularly, to an improved caching system for digital versatile disc systems. More particularly still, the present invention relates to a caching system within a digital versatile disc system that manages multiple views of a given video image.

BACKGROUND OF THE INVENTION

Digital versatile discs (DVDs) are information storage devices used for storing prerecorded audio information, movies and computer software. The storage and playback mechanism used in DVDs closely resembles the mechanism used in compact discs (CDs). DVD players and their software use the same laser technology as CD players. Briefly, both DVDs and CDs store information as a pattern of pits formed in a metallic substrate. The pit patterns form digital words and can be read by shining a laser beam on the disc surface and detecting the reflected beam. However, the information storage capacity of a typical DVD is much higher than a CD. Presently available DVDs have a variety of capacities which depend on the technology used to manufacture the discs. Single-layer technologies can be either single or double-sided with capacities of 4.7 gigabytes and 9.4 gigabytes, respectively. Dual layer technologies will soon be available which use single or double sided capacities that hold approximately 8.5 gigabytes per side. This high information storage capacity makes DVDs suitable for storing not only audio information, but also video information and large amounts of computer data as well.

DVD players have many CD player features, such as the ability to play selections in any order desired and the ability to read information from any point on the disc. However, DVDs can store information in several formats. For example, DVDs which are used to store video information (hereinafter called DVD-VIDEO discs) may use various known information compression algorithms, such as MPEG-2 for video compression/decompression. A DVD may also include high fidelity sound as well. In addition, a DVD may also store uncompressed linear pulse code modulated data streams which have sample rates between 48–90 kHz and are sampled at 16 or 24 bits. Still other DVD versions (hereinafter called DVD-ROM discs) can store digital data for computer use, and the data may also be compressed on these discs.

One feature in DVD systems and recorded media is the ability to view the same subject matter at different angles. The user has the option of viewing a primary viewing angle of a given subject matter and then selecting alternative angles of the same subject matter synchronized to the same procession of the primary view. The DVD disk stores these various angles while the DVD player reads the entire disk and temporarily stores each particular angle or the data encoded for playback of each angle within the caching system. Conventional DVD host-based caching systems operate by reading the data before it is requested by an application. When the application needs the data, it retrieves the data from the internal memory store or the cache, rather than from the optical device or the disk. Unfortunately, traditional caching techniques are not effective with DVD content since data for as many as nine different angles may be interleaved in a single DVD data stream. The interleaved data reduces the hit success ratio since up to 89% of the data in the cache may belong to one of the other angles that is not currently being viewed. Accordingly, the cache must be flushed more frequently since navigation requires constant jumps to different locations in order to show the appropriate angle.

Accordingly, a need exists for a method and system that allows caching of DVD content containing multiple viewing angles and that overcomes the problems of actually caching the additional views not being displayed.

SUMMARY OF THE INVENTION

According to the present invention, a caching method and system for use in a DVD player is disclosed that selectively caches only one of multiple viewing angles recorded on the DVD medium. This system allows optimization of the caching resources by only caching that portion of the DVD stream that relates to the currently selected angle being displayed or viewed during video playback. If another viewing angle is selected, the current contents of the cache for the previously-selected viewing angle are discarded and the system proceeds to cache the data for the newly selected viewing angle.

The caching apparatus is utilized in a digital versatile disk (DVD) system that has a DVD reader for generating a DVD data stream. The DVD data stream comprises data related to multiple viewing angles and the caching apparatus is able to selectively cache a viewing angle to be displayed from the multiple viewing angles. The caching apparatus includes a cache load thread for receiving the DVD stream and also for extracting a data portion of the DVD data stream associated with the selected viewing angle from the multiple viewing angles. Additionally, program logic is configured to store the selected data portion within the cache system. A user request thread is provided that allows downloading of the selected data stored within the cache, wherein the data portion stored is only that of the selected viewing angle.

The cache load thread is able to parse angle information from the data stream that is related to the selected viewing angle. This angle information includes a starting address as well as an ending sector to define the respective beginning and ending points of the viewing angle. Additionally, when a starting sector for a new viewing angle is received upon receipt of the end sector of the previously selected viewing angle, the new viewing angle begins play as the previous viewing angle ends.

The user request thread begins downloading data stored in the cache upon notification that the cache is fully loaded and ready for downloading. The user request thread also notifies the cache load thread when the data has been down loaded from the cache so that the cache load thread can begin reloading the cache with the next portion of data.

The method operates similarly to the apparatus in that it receives a DVD data stream from the DVD player and extracts a data portion of the DVD data stream associated with the selected viewing angle. The method then stores the selected data portion within the cache memory and downloads the selected data upon notice that the cache memory is full. The method uses angle information from the data stream, such as the beginning portion and the end sector, to control just how much caching is necessary and when to begin caching a new viewing angle. The method can be incorporated in program code for loading within a computer system in order to modify the computer system to operate in a manner consistent with the method and apparatus as previously described.

BRIEF DESCRIPTION OF THE DRAWINGS

The above and other features, objects and advantages of the invention will be better understood by referring to the following detailed description in conjunction with the accompanying drawing in which.

DETAILED DESCRIPTION OF THE PREFERRED EMBODIMENT

Figure 1:
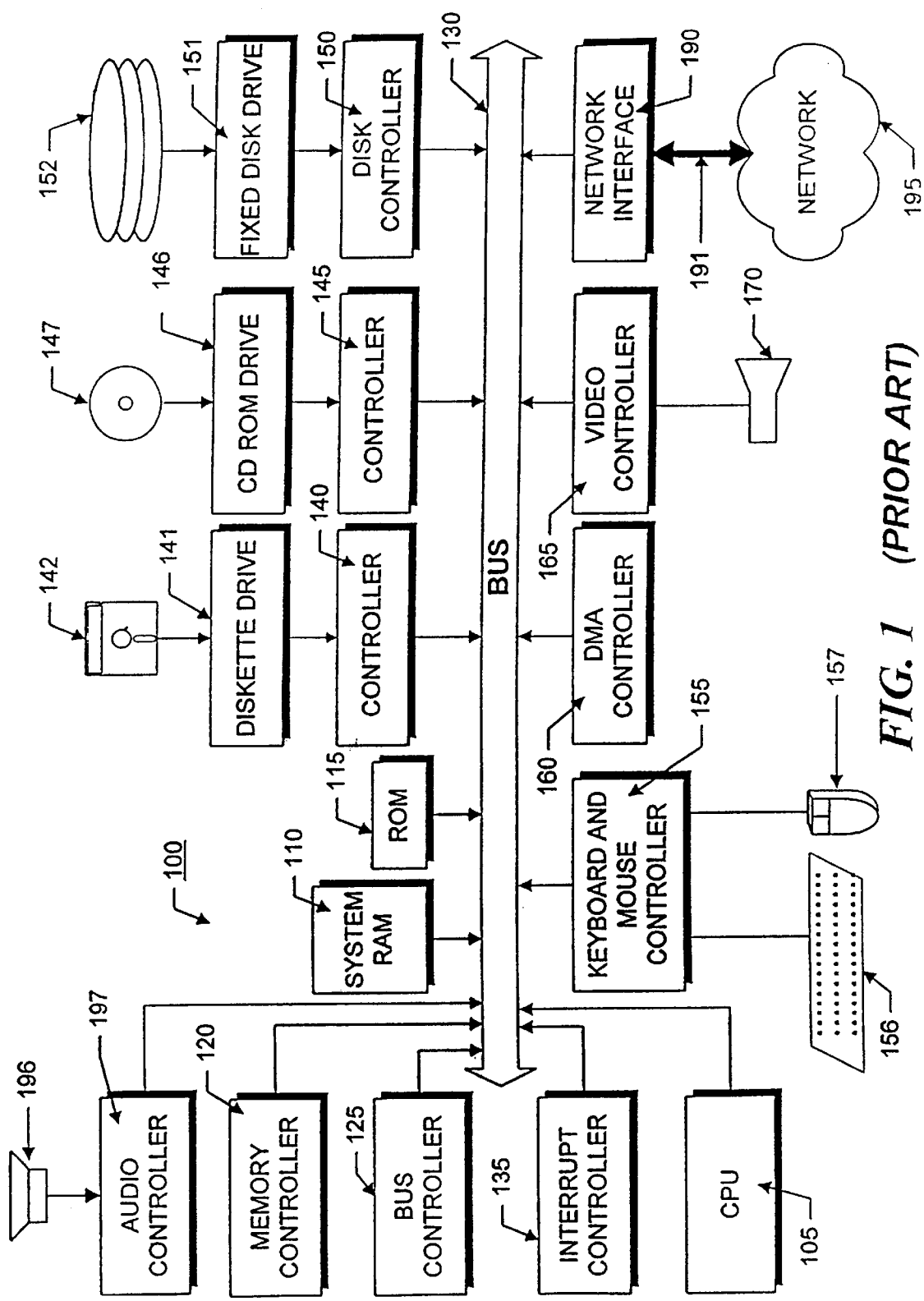
FIG. 1 is a block diagram of a computer system suitable for use with the present invention.

FIG. 1 illustrates the system architecture for a computer system 100 such as an IBM PS/2®, on which the invention may be implemented. The exemplary computer system of FIG. 1 is for descriptive purposes only. Although the description may refer to terms commonly used in describing particular computer systems, such as in an IBM PS/2 computer, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 130 by a controller 140. Similarly, CD ROM 147 is insertable into CD ROM drive 146 which is, in turn, connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adapter 190 which allows the system to be interconnected to a local area network (LAN) or a wide area network (WAN), schematically illustrated by bus 191 and network 195.

Operation of computer system 100 is generally controlled and coordinated by operating system software, such as the OS/2® operating system, available from International Business Machines Corporation, Boca Raton, Fla. The operating system controls allocation of system resources and performs tasks such as processing scheduling, memory management, networking, and I/O services, among other things. In particular, an operating system resident in system memory and running on CPU 105 coordinates the operation of the other elements of computer system 100. The present invention may be implemented with any number of commercially available operating systems including OS/2, UNIX, DOS, and WINDOWS, among others. One or more applications such as Lotus NOTES™, commercially available from Lotus Development Corp., Cambridge, Mass. execute under the control of the operating system. If operating system 200 is a true multitasking operating system, such as OS/2, multiple applications may execute simultaneously.

Figure 2:
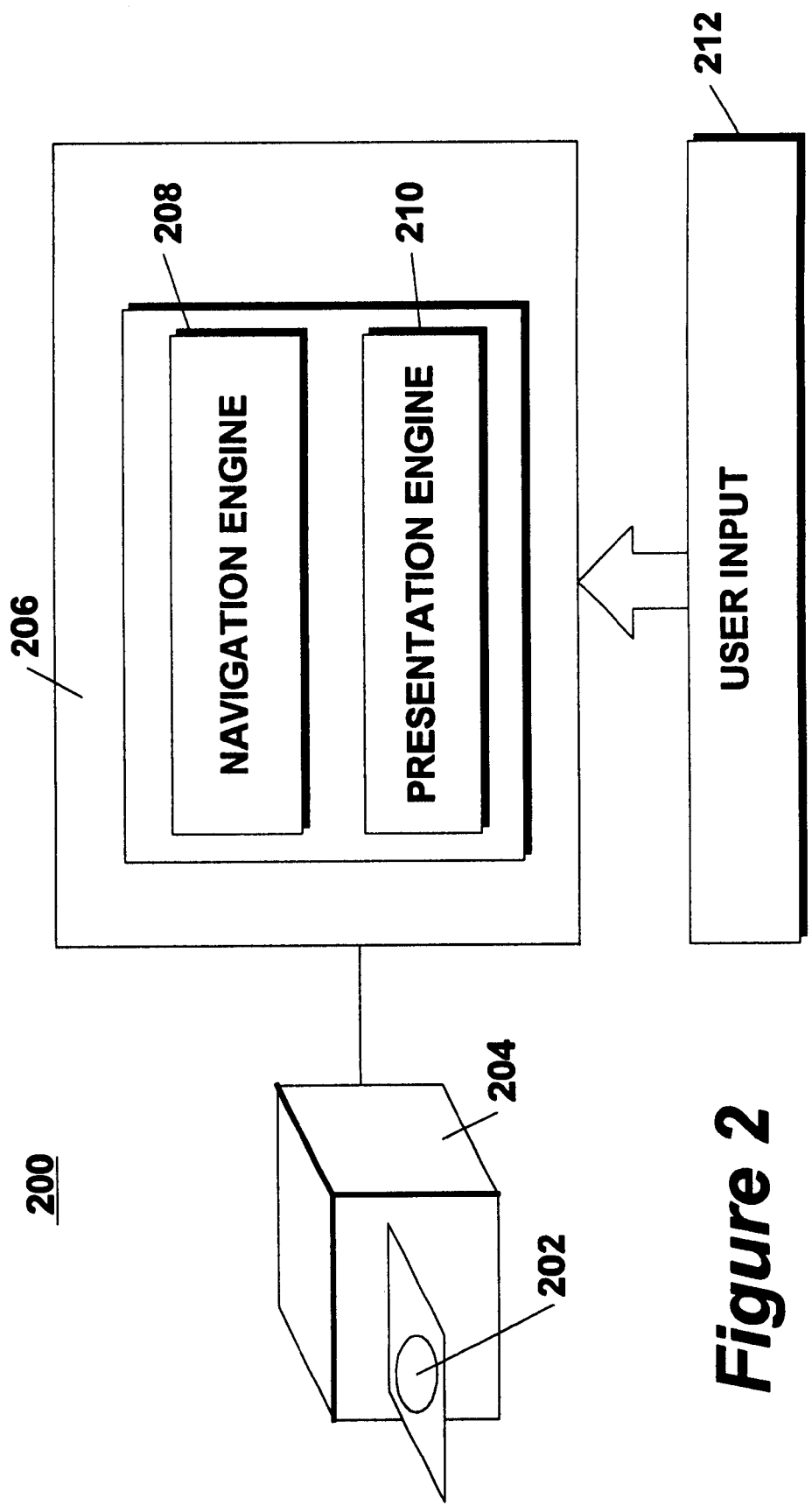
FIG. 2 is a conceptual diagram of the elements comprising a DVD system including a DVD drive and an accompanying computer with software components installed therein.

FIG. 2 illustrates conceptually the main components of a system 200 in accordance with the present invention. FIG. 2 shows a DVD-ROM drive 204 connected to a computer 206. Use of the DVD-ROM drive 204 with the computer 206 should not be construed as a limitation of the invention, however, since other DVD systems, such as a DVD-VIDEO systems, may be used with many other types of multimedia devices, including television systems. In addition, the DVD-ROM drive 204 may also be a drive suitable for internal mounting in computer 206.

The DVD drive 204 receives a disc 202 containing compressed and encoded information which has been coded in accordance with the DVD 1.0 Specification for read-only disk and disk 202 may contain up to seventeen gigabytes of information. The computer 206 includes a driver, not shown for enabling the operating system in the computer 206 to control and exchange information with the drive 204. One or more input devices 212 which receive input from a user.

The computer 206 also includes a control and playback program shown schematically in FIG. 2 as having a navigation object 208 containing logic for reading data from the drive 204. A presentation engine 210 includes decompressing and decoding routines for decoding the information on the disc 202 and routines for formatting the information for display. For example, the audio information may be compressed by means of conventional compression technique known as Dolby® AC-3® compression also known as "Dolby Digital" decompression, and video information may be compressed using a compression technique known as Moving Picture Experts Group-2 MPEG-2.

In the illustrative embodiment, the software elements of system 200 are implemented using object-oriented programming techniques. As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the methods which manipulate the data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor which uses the corresponding class definition and additional information, such as arguments provided during object creation, to construct the object. Likewise objects are destroyed by a special function called a destructor. Objects may be used by using their data and invoking their functions. When an object is created at runtime memory is allotted and data structures are created.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the attributes and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, at runtime, the program will determine which of the three functions is actually called by examining the variable types. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

In accordance with the principles of the present invention, the caching system is multi-threaded, that is, it uses several independently running threads to perform the operations required by the system. In particular, during DVD playback, two threads are created. The first thread is a data caching thread, which defines and controls the caching of a current viewing angle selected by the user. The second thread is a service user's request thread, which processes user requests, such as cache retrieval and viewing angle caching update. The concept of threads as well as the use of semaphores, is further described in commonly assigned U.S. patent application Ser. No. 09/014,480 entitled DVD NAVIGATION SYSTEM WITH MULTIPLE INDEPENDENT THREADS herein incorporated by reference for all purposes.

Figure 3:
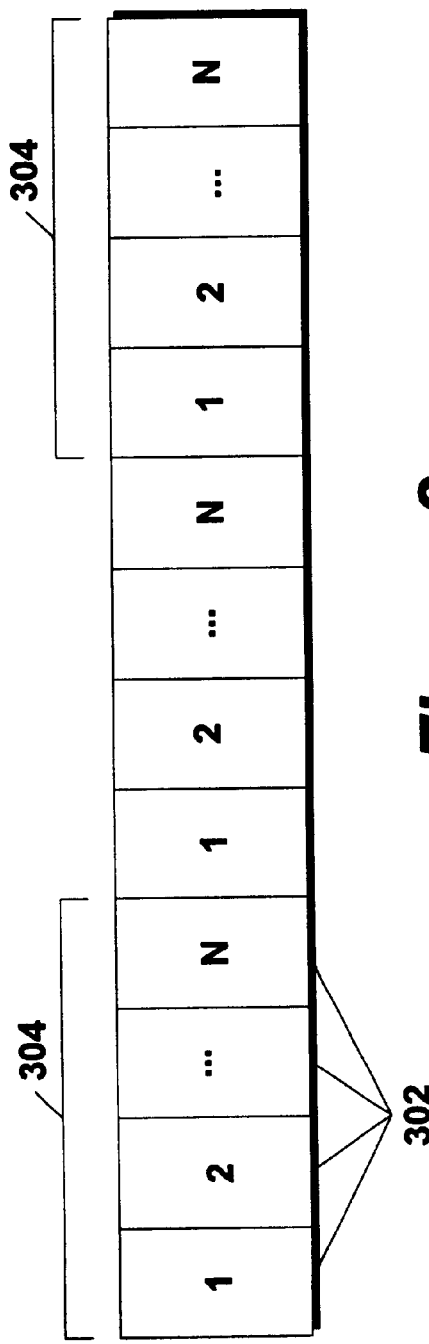
FIG. 3 is a conceptual diagram of multiple angle blocks with N view angles.

DVD medium may contain a multiple number or N views. These views maybe be of the same or different subject matter. A block diagram is illustrated in FIG. 3 that depicts the number of views that are incorporated within a single angle block 302. Angle block 302 interleaves the angle content for 1 through N views 304. Multiple angle blocks 302 are provided and are read sequentially by the DVD player regardless of whether the N views are actually to be viewed. With these additional views blocked together, the content for N−1 views will be cached unnecessarily and then must be discarded since the data will not be used by the system during playback. Thus, the cache system presented eliminates the caching of the extraneous views 2 through N, where angle view 1 is selected. Likewise, if angle 3 or angle 4 has been selected for viewing, then the remaining angles not selected would not be cached during this operation. Any time any of the other angles are selected for view, the cache contents are discarded and caching begins with the newly selected angle. The ability to cache only one angle reduces buffer overload and increases cache hits. Further, the system is able to more quickly adopt the coordinates with the optical devices internal memory cache thus allowing it to maximize performance with the selected angles. The system is able to do this by utilizing a DVD-ROM drive special angle API that alerts the microcode when to avoid hardware caching extraneous angles.

Figure 4:
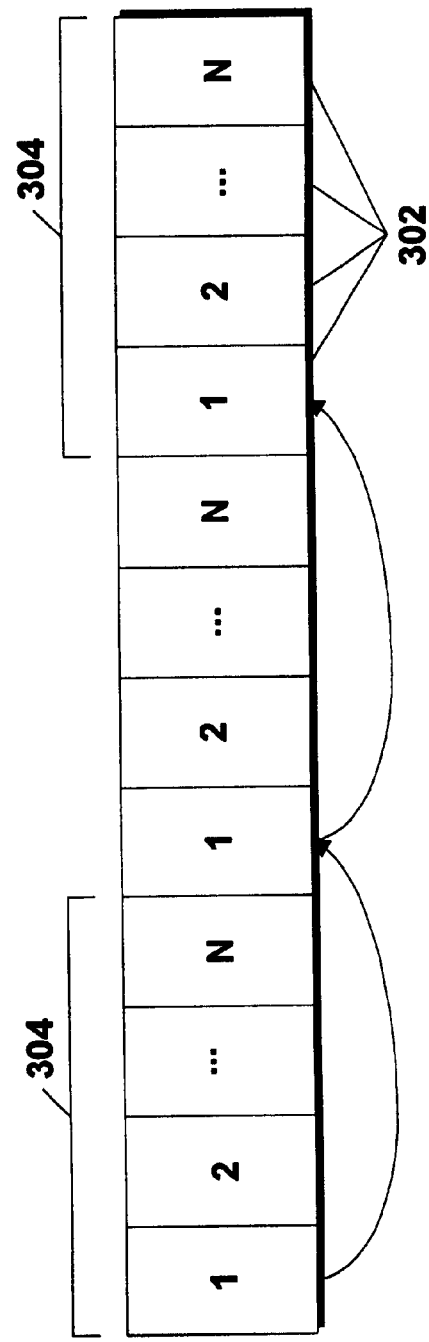
FIG. 4 is a conceptual diagram of the selective caching of data from a given view angle within the angle blocks of FIG. 3.

FIG. 4 depicts a block diagram of how the angle caching system operates. It is shown that where the first view angle 302 is selected, the system selectively caches this angle only as shown by the arrow pointing from the first angle 302 to next first angle 302 in the subsequent angle block 304. The system thus only stores data from the current viewing angle, in this case first angle 302, and ignores the remaining viewing angles 2 through N.

The caching system utilizes two threads of operation. The first thread is used to read data from the DVD ROM drive while the second thread is used to service the user's request. In an alternative embodiment, the DVD ROM drive system may utilize an interrupt service routine that selectively caches only the selected viewing angle as well as utilizing a user data thread to consume the data stored in the cache.

Figure 5:
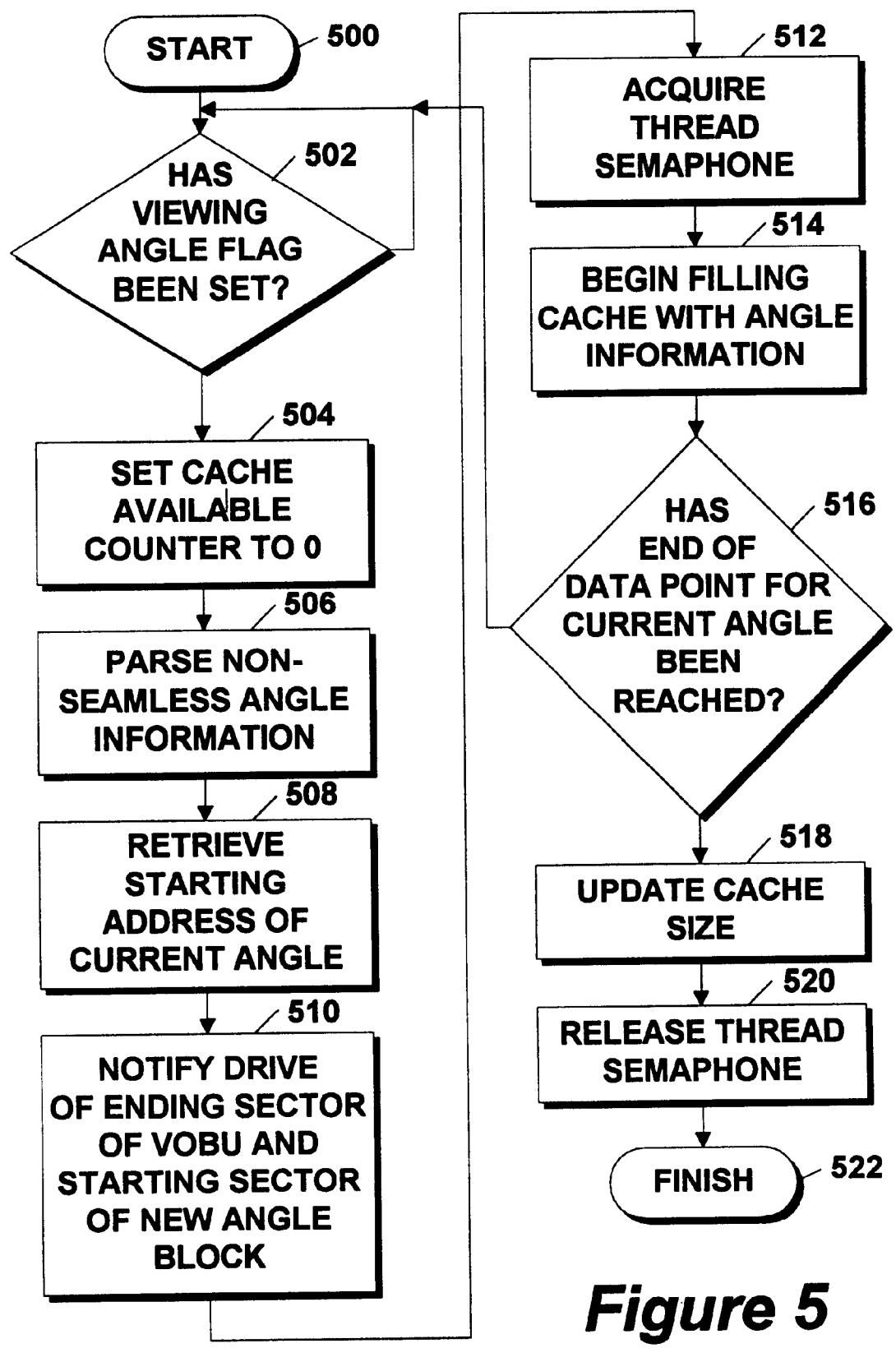
FIG. 5 is a flowchart illustrating a method for selecting and caching a single view angle from within an angle block of FIG. 4.

FIG. 5 is a flow chart depicting the process the system uses to determine the current viewing angle and then selectively caching only the contents associated with that particular viewing angle. The process begins in step 500 before proceeding to 502 where the system determines whether the viewing angle flag has been set. If the viewing angle flag has been set, the system proceeds to step 504 where the system sets the cache available counter to zero (0) to indicate that no data is in the cache. If the viewing angle flag has not been set, the system returns to step 502 until such a time as the viewing angle flag is set. The system then proceeds to step 506 where it parses the non-seamless angle information found in the presentation control information (or PCI) of the DVD stream. The parsing of the non-seamless angle information allows the system to determine the number of Video Object Units (VOBUs or data) in the current angle block. The system next proceeds to step 508 to retrieve the starting address of the current angle in the next angle block. In step 510, the system notifies the DVD-ROM drive of the ending sector of the VOBU in the current angle block and the starting sector of the next angle block. This allows the DVD-ROM drives to fill their hardware cache automatically when the last sector in the angle block is reached, thereby increasing performance time. In step 512, the system acquires the threads semaphore and proceeds to step 514 where the system begins to fill the cache with the angle information.

At this point, the system then determines, in step 516, whether the end of the data point has been reached for the current angle. If the end of the data point for the current angle has been reached, the system returns to the beginning of the process to select the next angle to be viewed by checking the angle flag as set in block 502. Otherwise, the system proceeds to step 518 where the system updates the cache size and then in step 520 releases the thread semaphore. At this point the system returns to normal processing in step 522.

Figure 6:
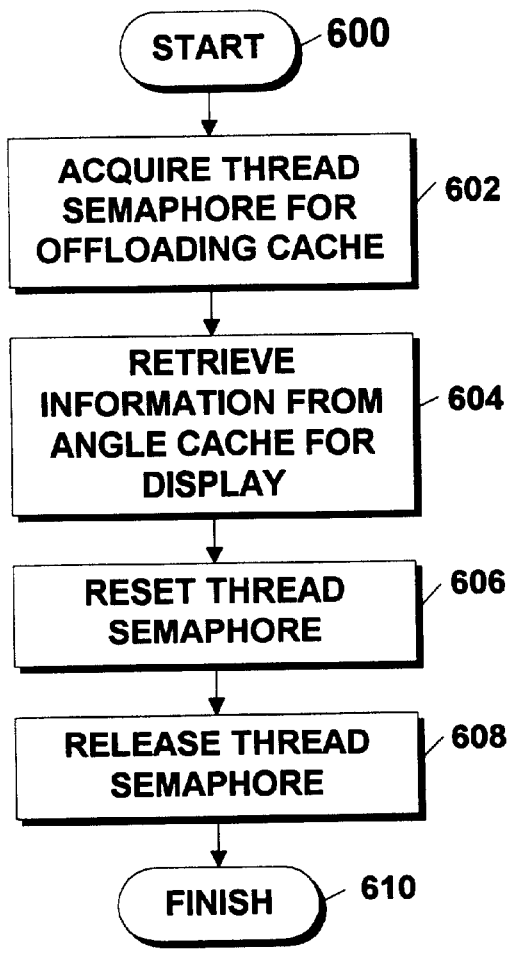
FIG. 6 is a flowchart illustrating a method for downloading of the cache buffer after being filled; and, FIG. 7 is a flowchart illustrating the method of selecting an alternative angle for viewing.

Once the cache is filled, the system needs to offload the contents in the cache upon a formal request. Such a process is described in the flow chart of FIG. 6. Beginning at step 600, the system proceeds to step 602 where the system acquires the thread semaphore associated with offloading the cache buffer. Next, in step 604, the system retrieves the information from the angle cache. Next, in step 606, the system resets the semaphore to indicate that the data has been removed from the cache and awaits the semaphore to be set again indicating that the cache is full and needs to be downloaded. After this, the system releases the thread semaphore in step 608 before returning in step 610.

Figure 7:
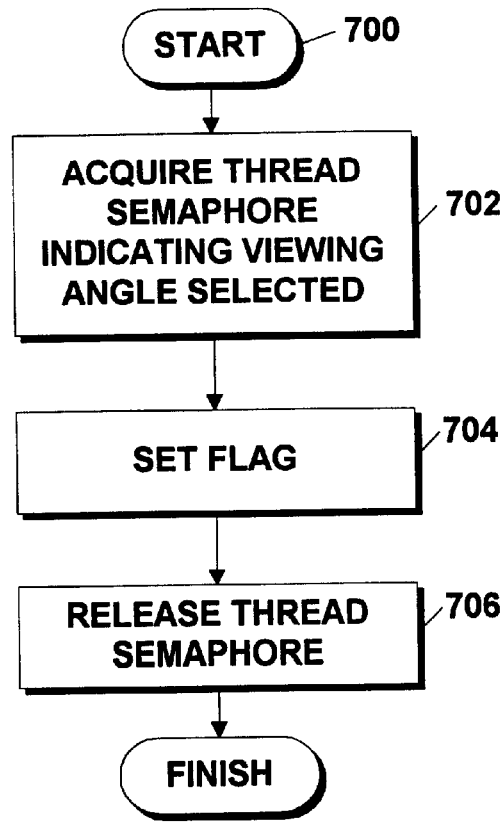

The system sets up the appropriate angle to be viewed based upon the user's input as depicted by the process illustrated in the flow chart of FIG. 7. At the beginning in step 700, the system proceeds to step 702 to acquire the thread semaphore that indicates a viewing angle has been selected. Next, in step 704, the system sets a flag to indicate the viewing angle has changed. Upon indication of the viewing angle has changed, the system, in step 706, releases the thread semaphore associated with changing or setting the angle to be viewed.

Since the current system is able to avoid caching data that is not to be utilized during operation, the system is able to increase the likelihood of an accurate cache hit by having more needed data loaded within the cache. Additionally, cache flushes are substantially reduced since the navigation no longer requires constant jumps to different locations in order to retrieve the needed data for the appropriate view angle. Further, excess data is no longer retrieved from the DVD ROM drive, thus freeing caching resources and bus access that would otherwise be utilized in caching extraneous information.

The above-described invention may be implemented in either all software, all hardware, or a combination of hardware and software, including program code-based implementations stored in firmware format to support dedicated hardware. A software application suitable for implementing the invention in is the Interactive DVD Browser (IDB), Version 1.0 and thereafter, commercially available from Oak Technology, Inc., Sunnyvale, Calif.

A software implementation of the above described embodiment(s) may comprise a series of computer instructions either fixed on a tangible medium, such as a computer readable media, e.g. diskette 142, CD-ROM 147, ROM 115, or fixed disk 152 of FIG. 1, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results. Such modifications to the inventive concept are intended to be covered by the appended claims.

What is claimed is:

1. A caching apparatus utilized in a digital versatile disk (DVD) system having a DVD reader for generating a DVD data stream comprising data related to multiple viewing angles within said data stream, the apparatus comprising:

a caching load thread for receiving the DVD data stream, parsing angle information from the data stream relating to a selected viewing angle, retrieving a starting address for the selected viewing angle to begin caching, and for extracting a data portion of the DVD data stream associated with the selected viewing angle from the multiple viewing angles;

program logic configured for storing the selected data portion within the cache apparatus; and a user request thread for downloading the selected data portion stored within the cache apparatus, the data portion being that of only the selected viewing angle.

2. A caching apparatus utilized in a digital versatile disk (DVD) system having a DVD reader for generating a DVD data stream comprising data related to multiple viewing angles within said data stream, the apparatus comprising:

a caching load thread for receiving the DVD data stream, parsing angle information from the data stream relating to a selected viewing angle, and for extracting a data portion of the DVD data stream associated with the selected viewing angle from the multiple viewing angles, the caching load thread further configured to receive an end sector notice for the selected viewing angle and a starting sector and to begin a newly selected viewing angle by replacing the selected viewing angle as the selected viewing angle ends;

program logic configured for storing the selected data portion within the cache apparatus; and a user request thread for downloading the selected data portion stored within the cache apparatus, the data portion being that of only the selected viewing angle.

3. The apparatus according to claim 1 wherein the user request thread receives notice to download data stored in the cache relating to the selected viewing angle for display.

4. The apparatus according to claim 3 wherein the user request thread notifies the caching load thread when the data has been offloaded from the cache.

5. A method for caching data parsed from a digital versatile disc (DVD) data stream, the data related to multiple viewing angles within said data stream, the method comprising:

receiving the DVD data stream;

parsing angle information from the data stream relating to a selected viewing angle;

retrieving a starting address for the selected viewing angle to begin caching; extracting a data portion of the DVD data stream associated with the selected viewing angle from the multiple viewing angles;

storing the selected data portion within a cache memory;

downloading the selected data portion stored within the cache memory, the data portion being that of only the selected viewing angle.

6. A method for caching data parsed from a digital versatile disc (DVD) data stream, the data related to multiple viewing angles within said data stream, the method comprising:

receiving the DVD data stream;

parsing angle information from the data stream relating to a selected viewing angle;

extracting a data portion of the DVD data stream associated with the selected viewing angle from the multiple viewing angles;

storing the selected data portion within a cache memory;

receiving an end sector notice for the selected viewing angle; upon receipt of a starting sector, replacing the selected viewing angle with a newly selected viewing angle; and downloading the selected data portion stored within the cache memory, the data portion being that of only the selected viewing angle.

7. The method according to claim 5 further comprising downloading data stored in the cache relating to the selected viewing angle for display upon notice.

8. The method according to claim 7 further comprising notifying when the data has been offloaded from the cache.

9. A computer program product for caching data parsed from a digital versatile disc (DVD) data stream as read by a DVD reader, the data related to multiple viewing angles within said data stream, the computer program product comprising a computer useable medium having program code embedded thereon comprising:

program code for receiving the DVD data stream;

program code extracting a data portion of the DVD data stream associated with a selected viewing angle from the multiple viewing angles;

program code for parsing angle information from the data stream relating to a selected viewing angle;

program code for retrieving a starting address for the selected viewing angle to begin caching;

program code for storing the selected data portion within a cache memory; and program code for downloading the selected data stored within the cache memory, the data portion being that of only the selected viewing angle.

10. A computer program product for caching data parsed from a digital versatile disc (DVD) data stream as read by a DVD reader, the data related to multiple viewing angles within said data stream, the computer program product comprising a computer useable medium having program code embedded thereon comprising:

program code for receiving the DVD data stream;

program code extracting a data portion of the DVD data stream associated with a selected viewing angle from the multiple viewing angles;

program code for parsing angle information from the data stream relating to the selected viewing angle;

program code for storing the selected data portion within a cache memory;

program code for receiving an end sector notice for the selected viewing angle; program code for replacing the selected viewing angle with a newly selected viewing angle, upon receipt of a starting sector; and program code for downloading the selected data portion stored within the cache memory, the data portion being that of only the selected viewing angle.

11. The computer program product according to claim 9 further comprising program code for downloading data portion stored in the cache relating to the selected viewing angle for display.

12. The computer program product according to claim 11 further comprising program code for notifying when the data portion has been offloaded from the cache.

* * * * *